United States Patent [19]

Hein

[11] Patent Number: 5,261,650
[45] Date of Patent: Nov. 16, 1993

[54] SNAP IN AUTOMOTIVE MOUNT

[75] Inventor: Richard D. Hein, Wabash, Ind.

[73] Assignee: GenCorp Inc., Fairlawn, Ohio

[21] Appl. No.: 774,771

[22] Filed: Oct. 10, 1991

[51] Int. Cl.⁵ .................................. B60G 13/00
[52] U.S. Cl. .................... 267/220; 267/153;
280/668; 411/353; 411/517; 403/326
[58] Field of Search ................ 267/33, 35, 220, 153;
280/668; 411/353, 516, 517, 521; 403/326

[56] References Cited

U.S. PATENT DOCUMENTS

| | | | |
|---|---|---|---|
| 2,141,878 | 12/1938 | Roby | 411/521 X |
| 2,238,238 | 4/1941 | Westrope | 411/521 X |
| 2,255,971 | 9/1941 | Hall | 411/521 X |
| 4,618,130 | 10/1986 | Veglia | 267/153 |
| 4,692,079 | 9/1987 | Killian et al. | 411/353 |
| 4,810,003 | 3/1989 | Pinch et al. | 188/321.11 X |
| 4,958,849 | 9/1990 | Pinch et al. | 267/153 X |

FOREIGN PATENT DOCUMENTS 3620774  1/1987  Fed. Rep. of Germany ...... 280/668
3713699 11/1987  Fed. Rep. of Germany ........ 267/35

Primary Examiner—Robert J. Oberleitner
Assistant Examiner—Kevin D. Rutherford

[57] ABSTRACT

A resilient mount is described as having a special spring steel retainer spring for locking the mount in a frusto-conically shaped opening which is defined by a hollow truncated rigid metal sleeve which has an annular abutment at its free outer edge. The mount has inner and outer rigid metal sleeves to which a resilient rubber insert is bonded. The insert essentially encases the outer sleeve and has a circumferential recess which extends inwardly of the insert adjacent the annular abutment. The recess is designed to receive the retainer spring which has a plurality of radially extending fingers for engaging the annular abutment to limit axial movement of the mount in one direction. The insert is also provided with an integral annular flange for engaging the opposite end of the truncated sleeve to limit axial movement of the mount in the other direction.

14 Claims, 1 Drawing Sheet

SNAP IN AUTOMOTIVE MOUNT

BACKGROUND OF THE INVENTION

The invention relates to automotive mounting devices, especially resilient elastomeric load dampening mounts which are used between an automobile chassis and a shock/coil spring module. Such modules and attached cushioning devices are usually bolted to the automobile frame. The invention is in a new and innovative resilient mount which is snapped into place and held there by a retainer spring without the need of nuts or bolts. This new mount has excellent load dampening and insulating characteristics to isolate the passenger compartment from undesirable vibrations and noise.

U.S. Pat. Nos. 2,886,355 and 3,531,144 disclose typical C-shaped retainer rings which are usually used to prevent the movement of shafts or rods. U.S. Pat. No. 3,354,302 discloses a lamp holder which employs a plurality of resilient fingers for gripping the sides of an adjacent opening in which the holder is mounted. For each case, the mount and its retention means are totally different from that of this invention.

Briefly stated, the invention is in a resilient mount which is snap-locked into a frustum-conically shaped opening in a rigid member, such as an automobile frame or chassis. The opening is defined by an annular abutment at its free, outwardly extending end. The mount comprises two rigid, radially spaced sleeves with a resilient, elastomeric annular insert bonded between them. The insert extends outwardly of the radially outermost sleeve and essentially encases this outer sleeve in elastomeric material which is provided with a circumferential groove or recess adjacent the annular abutment. The recess is designed to receive a retainer spring which has a number of arcuately spaced, L-shaped resilient fingers which are designed to snap outwardly of the opening and interlockingly engage the abutment to prevent the mount from exiting the opening in a direction opposed to that in which the mount was inserted into the opening. The elastomeric insert is also provided with an outwardly flowing annular flange to engage the rigid member adjacent the opening and prevent passage of the mount through the opening as it is inserted in the opening a distance where the fingers of the retainer spring deflect outwardly beyond the annular abutment of the opening.

DESCRIPTION OF THE DRAWING

The following description of the invention will be better understood by having reference to the accompanying drawing, wherein.

DETAILED DESCRIPTION OF THE DRAWING

Figure 1:
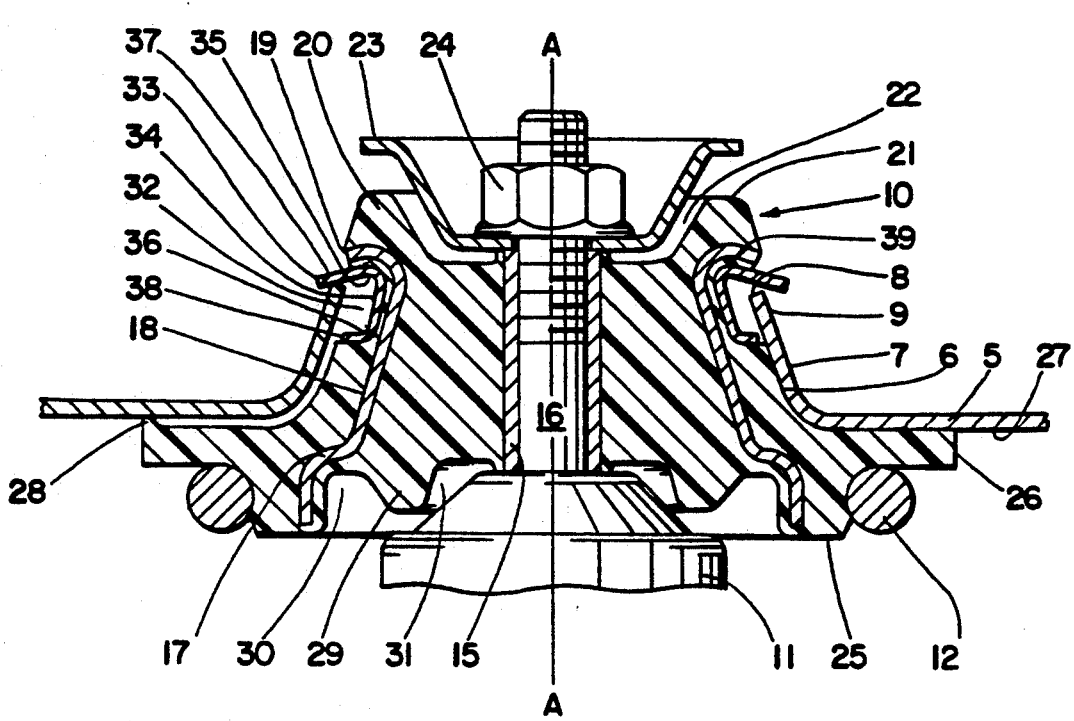
FIG. 1 is a cross-section of the mount with a portion of the shock/coil spring module, the section left of the center axis A—A designed to show the mount in a relaxed, unloaded condition, and the section right of the axis A—A showing the mount in a loaded condition with the attached shock/coil spring module.

With reference to FIG. 1, there is shown a rigid, metallic member 5, such as an automobile frame or chassis, with a frustum-conically shaped opening and which is defined by a hollow, truncated metal sleeve 7 which has an annular abutment 8 at its free, outstanding end 9.

A resilient mount 10 is mounted within the opening 6, and is provided as a shock or vibration dampening means between a shock absorber 11/coil spring 12 module or assembly and the automobile chassis. The mount 10 comprises a rigid, metallic, cylindrical inner sleeve 15 for slidably receiving a threaded shaft 16 which extends upwardly from the shock absorber 11 when, for purposes of this description, the center axis A—A of the mount 10 is vertically oriented and the automobile frame 5, adjacent the opening 6, lies in a horizontal plane. A rigid, outer metallic sleeve 17 is radially spaced outwardly of the inner sleeve 15, and has a truncated portion 18 which generally parallels the similarly oriented sleeve 7 of the opening 6 in the automobile frame 5. The vertically uppermost annular end 19 of the outer sleeve 17 is curved radially outwardly away from the inner sleeve 15, and the opposing, vertically lower most end of the outer sleeve 17 is vertically offset to enhance the adherence of the outer sleeve 17 with a surrounding, resilient elastomeric insert 20.

The elastomeric insert 20 is bonded between the inner and outer sleeves 15 and 17 of the mount 10 and extends outwardly of the outer sleeve 17 to essentially encapsulate the outer sleeve 17 in elastomeric material which, in this case, is any suitable rubbery material. The vertically uppermost end or topside 21 of the insert 20 is provided with an inwardly directed frusto-conically shaped recess 22 for receiving a matingly shaped jounce washer 23 and nut assembly 24 which is used to fasten the mount 10 to the protruding shaft 16 of the shock absorber 11. The bottomside or vertically lowermost end 25 of the insert 20 is flared radially outwardly to form an annular flange 26 which is designed for compressive engagement with the underside 27 of the automobile frame 5 adjacent the opening 6, when the mount 10 is properly attached to the frame 5. A special vapor seal in the form of an integral, resilient, annular protuberance 28 is provided adjacent the outer periphery of the annular flange 26 for engaging the underside 27 of the frame 5, as best seen to the left of axis A—A in FIG. 1. The bottomside 25 of the insert 20 is provided with an annular ridge 29 and adjacent valleys 30, 31, as a means for varying the spring rate of the mount 10 and for allowing the absorption or dampening of small shocks without bringing the full shock dampening characteristics of the mount 10 to bear, thereby providing smoother shock absorption of the varying size loads imparted to the mount 10. The location and size of the valleys or voids 30,31, can be varied depending, for example, on the size and weight of the vehicle on which the mount 10 is used. A circumferential recess 32 is provided in the rubber insert 20 just below the curved upper end 19 of the outer sleeve 17, and is designed to receive a retainer clip or spring 33 which coacts with the abutment to prevent withdrawal of the mount 10 from the opening 6, after the mount 10 is inserted a predetermined desired distance into the opening 6 where the annular flange 26 engages the adjacent underside 27 of the frame 5.

Figure 2:
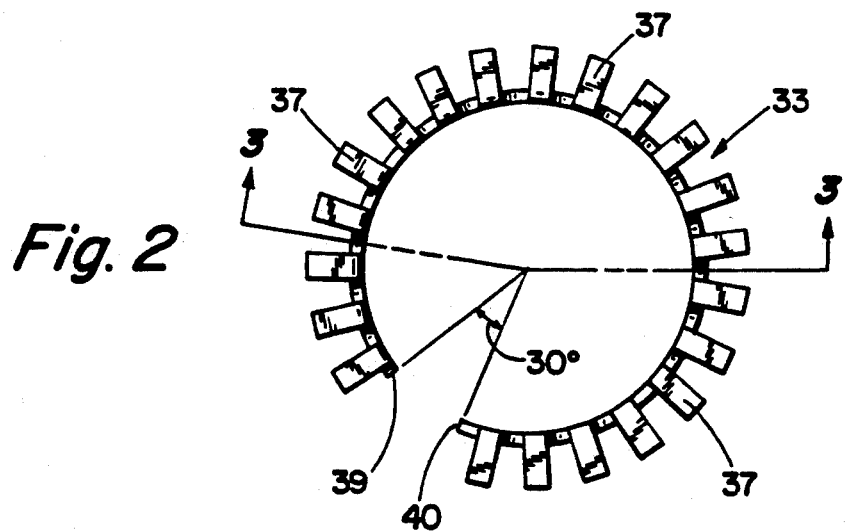
FIG. 2 is a plain view of a retainer spring which is made in accordance with the invention.
Figure 3:
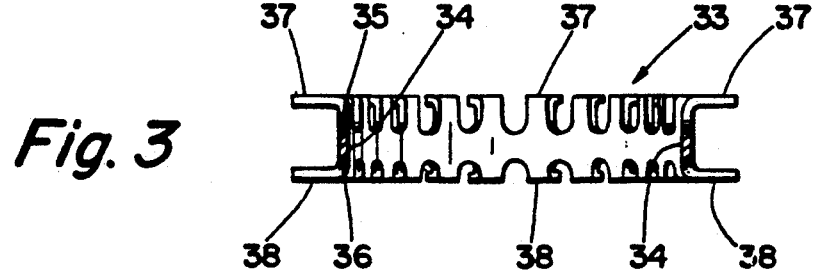
FIG. 3 is a side view of the retainer spring viewed from the line 3—3 of FIG. 2.

The retainer spring 33, as best seen in FIGS. 2 and 3, has a parti-cylindrical web 34 formed around a center axis and having a pair of opposing parallel marginal edges 35,36, from which a plurality of arcuately spaced, generally L-shaped upper and lower fingers or tines, e.g. fingers 37,38, extend outwardly from the web 34 in planar relation and then radially outwardly from the center axis of the web 34 forming thereat flat, rectangularly shaped finger tips which are at right angles to the adjacent connecting portions of the web 34. The upper fingers 37 are longer, measured from the web 34, than the lower fingers 38 which are vertically aligned with the upper fingers 37 when the retainer spring 33 is horizontally disposed. The retainer spring 33 is composed of any suitable spring steel to permit deflection and return of the upper fingers 37 to and from the lower fingers 38. The parti-cylindrical web 34 has a pair of confronting opposing ends 39,40, which are arcuately spaced about 30 degrees apart to permit removal of the retainer spring 38 from the circumferential recess 32 so that, if necessary, the mount 10 can be removed from the opening 6.

The retainer spring 33 is inserted in the circumferential recess 32, prior to the placement of the mount 10 in the opening 6. As the mount 10 is forced upwards into the opening 6, the truncated sleeve 7 of the opening 6 will engage the upper fingers 37 and deflect them downwardly until they pass beyond the annular abutment 8 and spring outwardly free of the truncated sleeve 7. Upon attachment to the shock/coil spring module, the lower annular elastomeric flange 26 will compressively engage the adjacent underside 27 of the frame 5 and the upper fingers 37 will be spaced slightly above the annular abutment 8 to permit slight shock dampening movement of the mount 10 before the upper fingers 37 contact the annular abutment 8, as seen to the right of axis A—A in FIG. 1. The curved, upper, rubber covered underside 39 of the upper, annular end 19 of the outer sleeve 17, engages the upper fingers 37 to keep them in a slightly downwardly deflected position, so that they would have to be sheared off to permit passage of the mount 10 in a downwardly direction from the opening 6.

As seen in FIG. 1, the elastomeric material of the insert 20 outboard of the outer sleeve 17, provides isolation of the mount 10 from the frame 5. The elastomeric seat of the coil spring 10 against the mount 10, also acts to isolate the coil spring 12 from the adjacent frame 5 to help insure a quieter and more pleasant ride for people in the passenger compartment. The outer sleeve 17 of the mount 10 figuratively floats in the encompassing elastomeric material to better accommodate conical movements of the mount 10.

Thus, there has been described a unique mount and retainer spring assembly which is quick and easy to install and has excellent isolating characteristics preventing undesirable metal to metal contact and the resulting noise and vibration from such contact.

What is claimed is:

1. A shock dampening mount used to hold an automotive part in a frustum-conically shaped opening defined by a hollow, truncated rigid sleeve which has a center axis and an annular abutment at its free marginal edge, the mount comprising;
   (a) a pair of radially spaced, rigid hollow sleeves, including a one-piece outer sleeve which is radially spaced outwardly from an inner sleeve, the sleeves being concentrically disposed about the center axis of the opening, and the outer sleeve having a pair of opposing annular ends, one of which ends is spaced above the abutment, when the mount is in a horizontal position
   (b) a resilient elastomeric insert having at least a portion thereof bonded between the inner and outer sleeves and essentially encasing the outer sleeve, the insert having a circumferential recess between the opposing ends of the outer sleeve adjacent the annular abutment, when the mount is properly positioned in the opening, the recess extending radially inwardly of the insert;
   (c) a retainer spring positionable in the recess for engaging the abutment to limit movement of the mount in a direction opposite from which the mount is inserted in the opening, the spring including a parti-cylindrical web with a pair of opposing marginal edges from which a number of resilient, L-shaped fingers extend, when the spring is undistorted outside the recess;
   (d) means associated with the insert for limiting movement of the insert in the direction in which the mount is inserted in the opening; and
   (e) means coacting with the retainer spring for maintaining the spring in movement limiting relationship with the annular abutment.

2. The mount of claim 1, wherein the retainer spring is composed of spring steel.

3. The mount of claim 2, wherein the fingers have free ends which are flat and generally rectangular, in shape, and which extend in radial directions from the web and center axis of the opening, the overall diameter of the retainer spring, measured between the radially outermost free ends of the fingers, being greater than the diameter of the annular abutment.

4. The mount of claim 3, wherein the means coacting with the retainer spring, includes an adjacent, curved, annular marginal edge of the outer sleeve which engages the fingers and holds them in a slightly deflected position towards the annular abutment.

5. The mount of claim 4, wherein the means (d) associated with the insert includes an annular elastomeric flange which is integral with the insert in spaced relation from the recess and abutment.

6. The mount of claim 5, which includes means for varying spring rate of the mount, including at least one void in the elastomeric insert.

7. A shock dampening mount used to hold an automotive part in a frustum-conically shaped opening defined by a hollow truncated rigid metal sleeve which has an annular abutment at its outstanding free marginal edge, comprising:
   (a) a pair of radially spaced rigid metal sleeves, including a hollow cylindrical radially innermost sleeve and a one-piece, generally hollow truncated radially outermost sleeve which has an annular, curved marginal edge adjacent the annular abutment when the mount is properly positioned in the opening, the curved marginal edge curving radially outwardly in a direction away from the inner sleeve and being in spaced relation from an opposing, annular marginal edge, the curved marginal edge terminating in spaced relation above the annular abutment, when the mount is in a horizontal position;
   (b) a resilient, elastomeric insert bonded between the inner and outer sleeves and extending outwardly of the outer sleeve and essentially encasing the outer sleeve in elastomeric material, the insert having a pair of opposing ends, one end of the insert being farthest spaced from the annular abutment and being flared radially outwardly in a direction away from the inner sleeve and forming an annular elastomeric flange for engaging portions of the truncated sleeve, defining the opening, farthest spaced from the annular abutment, the other opposing end of the insert including (i) a circumferential recess extending radially inwardly of the insert between the opposing ends of the outer sleeve adjacent the annular abutment and curved marginal edge of the outer sleeve; and (c) a generally, annular retainer spring positionable in the circumferential recess in the insert, the spring including a cylindrical web with a pair of opposing marginal edges from which a plurality of L-shaped fingers extend in radial directions outwardly beyond the annular abutment to limit travel of the mount in an axial direction opposite the direction in which the mount is moved to position the mount in the opening, the curved marginal edge of the outer sleeve being designed to hold the fingers in positions slightly deflected towards the annular abutment.

8. A shock dampening mount used to hold an automotive part in a frustum-conically shaped opening defined by a hollow truncated rigid metal sleeve which has an annular abutment at its outstanding free marginal edge, comprising:

(a) a pair of radially spaced rigid metal sleeves, including a hollow cylindrical radially innermost sleeve and a generally hollow truncated radially outermost sleeve which has an annular, curved marginal edge adjacent the annular abutment when the mount is properly positioned in the opening, the curved marginal edge curving radially outwardly in a direction away from the inner sleeve;

(b) a resilient, elastomeric insert bonded between the inner and outer sleeves and extending outwardly of the outer sleeve and essentially encasing the outer sleeve in elastomeric material, the insert having a pair of opposing ends, one end of the insert being farthest spaced from the annular abutment and being flared radially outwardly in a direction away from the inner sleeve and forming an annular elastomeric flange for engaging portions of the truncated sleeve, defining the opening, farthest spaced from the annular abutment, the other opposing end of the insert including (i) a circumferential recess extending radially inwardly of the insert adjacent the annular abutment; and (c) a generally, annular retainer spring positionable in the circumferential recess in the insert, the spring including a plurality of fingers which extend in radial directions outwardly beyond the annular abutment to limit travel of the mount in an axial direction opposite the direction in which the mount is moved to position the mount in the opening, the curved marginal edge of the outer sleeve being designed to hold the fingers in positions slightly deflected towards the annular abutment, the retainer spring including:

(d) a parti-cylindrical web having (i) a pair of opposing, confronting ends which are arcuately spaced a distance sufficient to permit placement and removal of the spring in and from the recess, when the mount is properly positioned in the opening, and (ii) a pair of parallel marginal edges; and (e) a plurality of arcuately spaced fingers secured to the marginal edges of the web, the fingers having flat, rectangular-shaped finger tips extending radially outwardly of the web beyond the annular abutment.

9. The mount of claim 8, wherein the retainer spring is composed of spring steel.

10. The mount of claim 9, which includes adjacent the outer periphery of the annular flange of the insert, an integral elastomeric annular protuberance for engaging a rigid surface adjacent thereto to seal any space between the flange and surface.

11. The mount of claim 10, wherein the insert has a top opposite the annular flange thereof, the top including a frusto-conically shaped recess which extends inwardly at the insert.

12. The mount of claim 11, wherein the insert has a bottom opposite the top thereof, the bottom including the annular flange and means radially inwardly thereof for adjusting the spring rate of a mount.

13. The mount of claim 12, wherein the insert is composed of rubbery material.

14. The mount of claim 13, wherein the curved marginal edge of the outer sleeve adjacent the retainer spring is covered with rubbery material.

* * * * *